(12) United States Patent
Chen

(10) Patent No.: US 7,623,481 B2
(45) Date of Patent: Nov. 24, 2009

(54) HYPER THROUGHPUT METHOD FOR WIRELESS LOCAL AREA NETWORK

(75) Inventor: Sheng-Chung Chen, Taipei (TW)

(73) Assignee: Via Technologies, Inc., Taipei (TW)

( * ) Notice: Subject to any disclaimer, the term of this patent is extended or adjusted under 35 U.S.C. 154(b) by 641 days.

(21) Appl. No.: 11/243,047

(22) Filed: Oct. 4, 2005

(65) Prior Publication Data

US 2007/0076675 A1    Apr. 5, 2007

(51) Int. Cl.
*H04B 7/212* (2006.01)

(52) U.S. Cl. ............... 370/322; 370/329; 370/338; 370/348; 370/443; 370/445; 370/447; 370/459; 370/461; 370/462

(58) Field of Classification Search .......... 370/338, 370/445, 447, 208, 328, 461, 322, 329, 348, 370/442, 443, 458, 459, 462
See application file for complete search history.

(56) References Cited

U.S. PATENT DOCUMENTS

| | | | | |
|---|---|---|---|---|
| 6,977,944 B2 * | 12/2005 | Brockmann et al. | ......... | 370/461 |
| 7,054,329 B2 * | 5/2006 | Cervello et al. | ............ | 370/447 |
| 7,522,552 B2 * | 4/2009 | Fein et al. | .................... | 370/328 |
| 2004/0240426 A1 * | 12/2004 | Wu et al. | ..................... | 370/350 |
| 2005/0002355 A1 * | 1/2005 | Takano | ........................ | 370/329 |
| 2005/0135318 A1 * | 6/2005 | Walton et al. | ............... | 370/338 |
| 2005/0254513 A1 * | 11/2005 | Cave et al. | .................... | 370/445 |
| 2006/0092885 A1 * | 5/2006 | Brockmann et al. | ......... | 370/335 |
| 2006/0153152 A1 * | 7/2006 | Kondylis et al. | ............ | 370/338 |
| 2006/0165042 A1 * | 7/2006 | Wang | .......................... | 370/338 |

\* cited by examiner

*Primary Examiner*—Aung S Moe
*Assistant Examiner*—Christopher P Grey
(74) *Attorney, Agent, or Firm*—Thomas, Kayden, Horstemeyer & Risley

(57) ABSTRACT

A hyper throuput packet transmission method for a wireless local area network operating in burst and protection mode is provided. A first CTS frame is sent, comprising an NAV to reserve the medium for a duration. Upon completion of the first CTS frame delivery, a plurality of data frames are delivered to the destination. Upon completion of the data frame delivery, a second CTS frame is sent to reserve the medium for another duration, such that the previous steps form a loop. Delivery of the data frames comprises, a data frame is delivered from the source to the destination, and after the data frame delivered, waiting for an ACK frame from the destination within one SIFS interval. Upon receipt of the ACK frame, if the following data frame is ready, the previous steps loop, otherwise the delivery is complete.

10 Claims, 11 Drawing Sheets

HYPER THROUGHPUT METHOD FOR WIRELESS LOCAL AREA NETWORK

BACKGROUND

The invention relates to wireless local area networks, and in particular, to a protection mechanism therefore providing high performance.

IEEE 802.11 is a wireless local area network standard comprising various purpose protocols. For example, request to send (RTS)/clear to send (CTS) is a medium reservation protocol, and CTS-to-Self is a CTS without a preceding RTS used by 802.11g stations (STAs) to reserve the medium in a basic service set (BSS) requiring "protection". ERP-OFDM (802.11g) and HS-DSSS (802.11b) are different modulation schemes utilizing the same frequency of 2.4 GHz, therefore "Protection" is required when the BSS is functioning in mixed mode supporting both standards.

FIG. 1 is a timing chart of conventional RTS/CTS protocol. When RTS/CTS is enabled on a particular station, it will refrain from sending a data frame until the station completes an RTS/CTS handshake with another station, such as an access point (AP). A source SRC initiates the process by sending an RTS frame. A destination DST receives the RTS frame and responds with a CTS frame within a short interframe spacing (SIFS) interval. SIFS is a predefined pause subsequently 16 µs in 802.11a (this value is different in 802.11 a/b/g/j). When the SRC receives the CTS frame, the DATA frame is confirmed as delivered. The CTS frame also contains a network allocation vector (NAV) that alerts other stations to refrain from accessing the medium while the SRC transmits the DATA frame. The source SRC and the destination DST, can be an AP/STA pair or STA/AP pair, and the RTS/CTS protocol is applicable for both downlink and uplink transmission. The RTS/CTS handshake provides positive control over the use of the shared medium. The primary reason for implementing RTS/CTS is to minimize collisions among hidden stations.

FIG. 2a shows a wireless network environment comprising both 802.11b and 802.11g stations 204 and 206, and one AP 202 supporting both standards. The 802.11b standard is an older version supporting only Complementary Code Keying (CCK) modulation. In addition to compatibility with the 802.11b standard, the 802.11g standard also utilizes Orthogonal Frequency Division Multiplexing (OFDM) modulation. Therefore various schemes are proposed to work with the mixed network environment.

FIG. 2b is a timing chart of a conventional CTS-to-self protocol for the wireless network environment in FIG. 2a. A source SRC initiates the transmission by sending a CTS frame, and then delivers the DATA1 frame within one SIFS interval. After delivering the DATA1 frame, an ACK1 frame is expected from the destination DST within one SIFS interval. If the ACK1 frame is not detected in time, the transmission of the DATA1 frame is deemed a failure. If the ACK1 frame is received as expected by the SRC, another data transmission is initialized, a DATA2 frame is delivered after sending a second CTS frame, and a second ACK2 is expected. The steps recursively loop as long as the DATA frames are available to send, thus the protocol is also referred to as a burst mode. In FIG. 2b, the CTS frame contains an NAV for reserving the medium for a period of time. From the falling edge of the CTS frame to the falling edge of the second ACK2 frame, the NAV protects a total of two DATA frames, two ACK frames, one CTS frame and a plurality of SIFS therebetween. The CTS frame is CCK modulated so all the 802.11b and 802.11g STAs are able to interpret the NAV to keep the medium clear during receipt. Thus, the CCK modulated CTS frames provide mixed mode protection by the NAV therein. In the CTS-to-self mechanism, the source SRC is typically an AP, and the destination DST is a STA. When the BSS does not exceed a predetermined scale, the role of SRC/AP may also be reversed.

SUMMARY

An exemplary embodiment of a hyper throughput mechanism or a packet transmission method for a wireless local area network operating in burst and protection modes is provided. A source transmits data to a destination by the hyper throughput mechanism according to the following steps. A first CTS is sent, comprising an NAV to reserve the medium for a duration. Upon completion of the first CTS delivery, a plurality of data frames are delivered to the destination. Upon completion of data frame delivery, a second CTS is sent to reserve the medium for another duration, such that the steps described form a loop. Delivery of a plurality of data frames comprises the following steps. A data frame is delivered from the source to the destination. After the data frame is delivered, an ACK is received from the destination within one SIFS interval. Upon receipt of the ACK, if the next data frame is ready, the above steps are repeated, until the data frame delivery is complete. The duration the NAV reserves, begins at the falling edge of the first CTS and ends at the falling edge of the second CTS.

If the ACK is not received within one SIFS interval, the data frame is deemed lost and retransmission is performed. The plurality of data frames may consist of two data frames. The CTS is a CCK modulation packet, and the data frames and the ACK are OFDM modulation packets.

The source may be an AP supporting 802.11b and 802.11g, and the destination may be a STA supporting 802.11g. Conversely, the source can be a STA and the destination can be an AP.

Another embodiment provides a hyper throughput method or a packet transmission method for a wireless local area network operating on a hyper throughput protection mode (HTPM). A source transmits data to a destination by the method comprising the following steps. First, an RTS comprising a first NAV is delivered to reserve the medium for a duration. ACTS is expected from the destination within one SIFS interval after the delivery of the RTS. Upon receipt of the CTS, a plurality of data frames are delivered to the destination. The delivery of the data frames consists of the following steps. A data frame is delivered from the source to the destination. An ACK is received from the destination within one SIFS interval after the data frame is delivered. Upon receipt of the ACK, if the next data frame is ready, the previous step is repeated until the data frame delivery is complete. The duration the first NAV reserves, begins at the falling edge of the first RTS and ends at the falling edge of the second ACK received from the destination. The ACK is a CCK modulation packet comprising a second NAV to reserve the medium for a total duration of two ACK, two SIFS and one data frame.

BRIEF DESCRIPTION OF THE DRAWINGS

The following detailed description, given by way of example and not intended to limit the invention solely to the embodiments described herein, will best be understood in conjunction with the accompanying drawings, in which:

FIG. 2b is a timing chart of a conventional CTS-to-self protocol for the wireless network environment in FIG. 2a;

DETAILED DESCRIPTION

Figure 1:
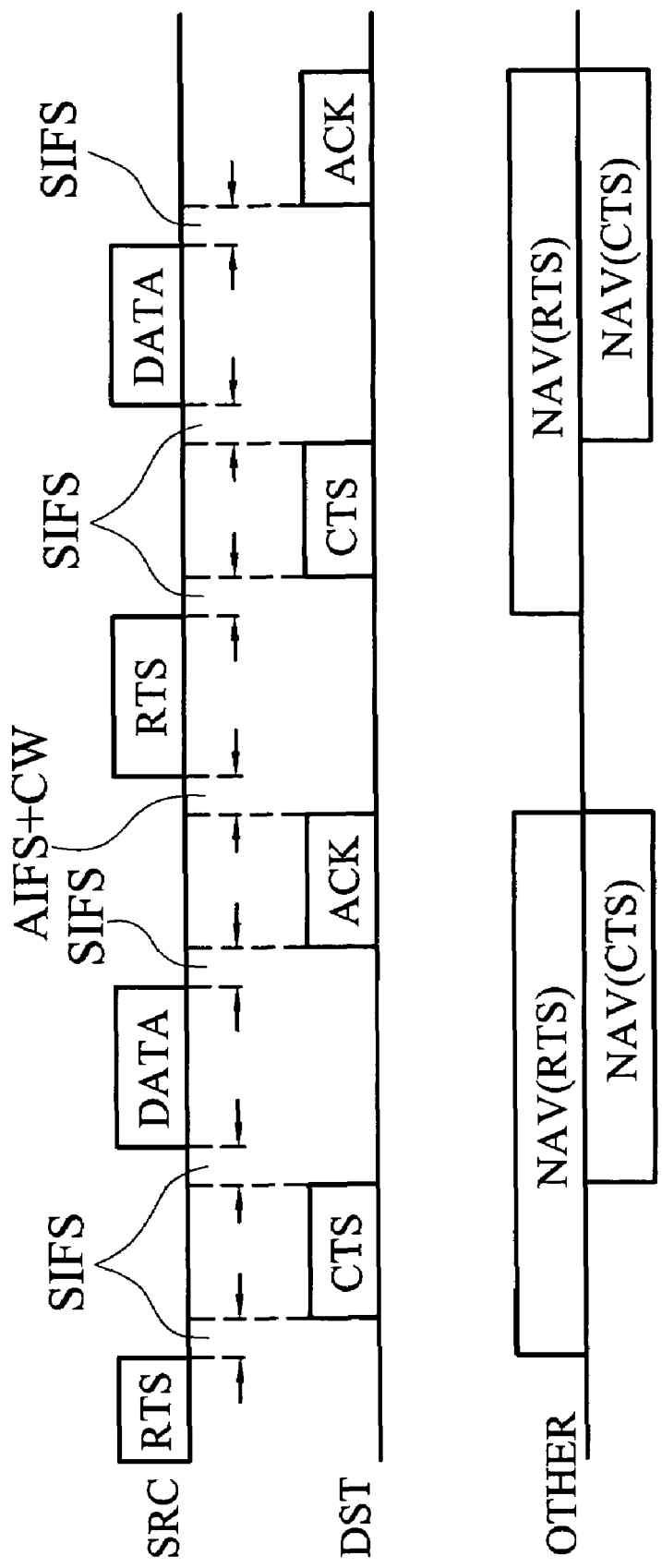
FIG. 1 is a timing chart of conventional RTS/CTS protocol.
Figure 2A:
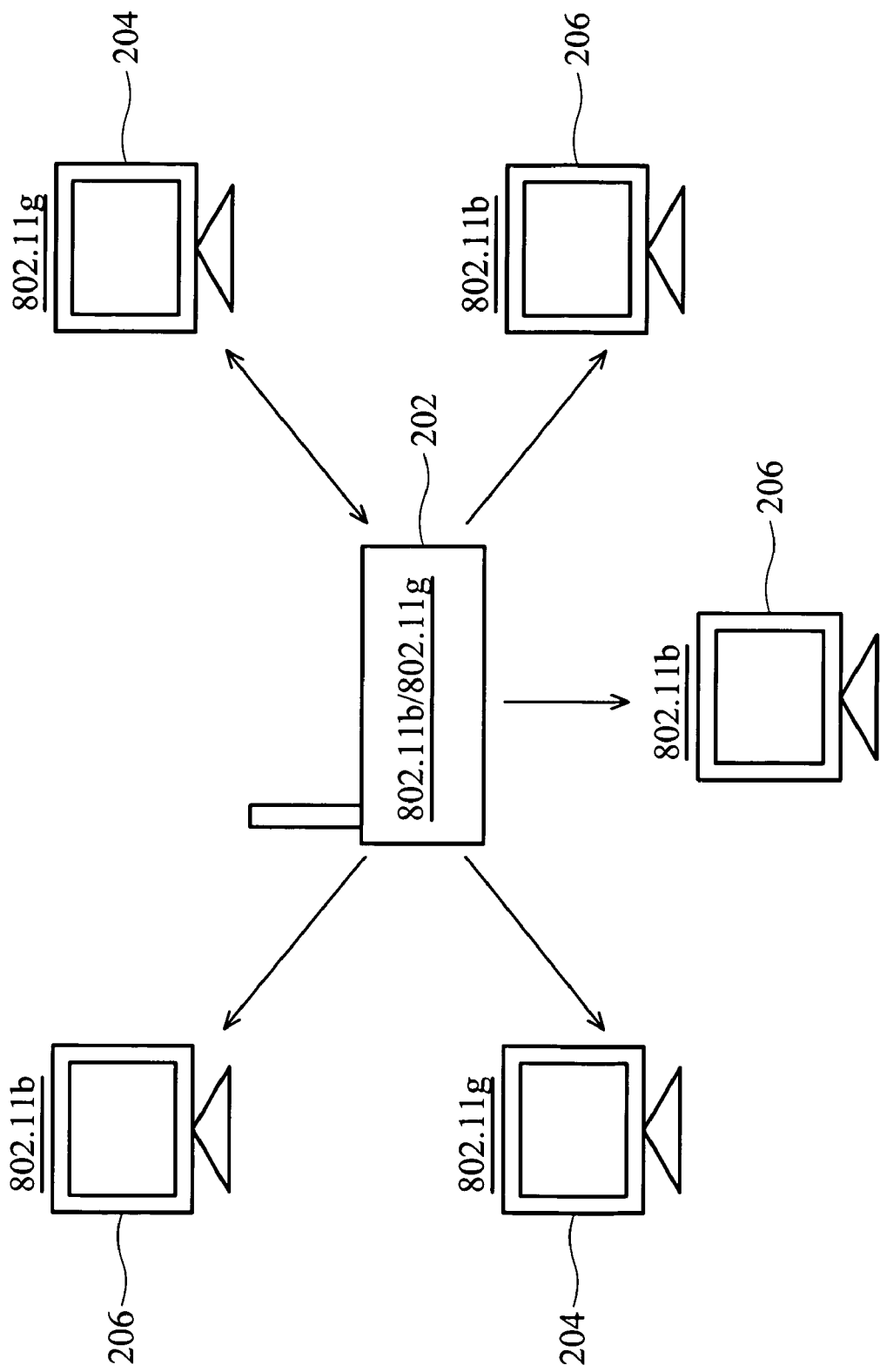
FIG. 2a shows a wireless network environment comprising both 802.11b and 802.11g stations.
Figure 2B:
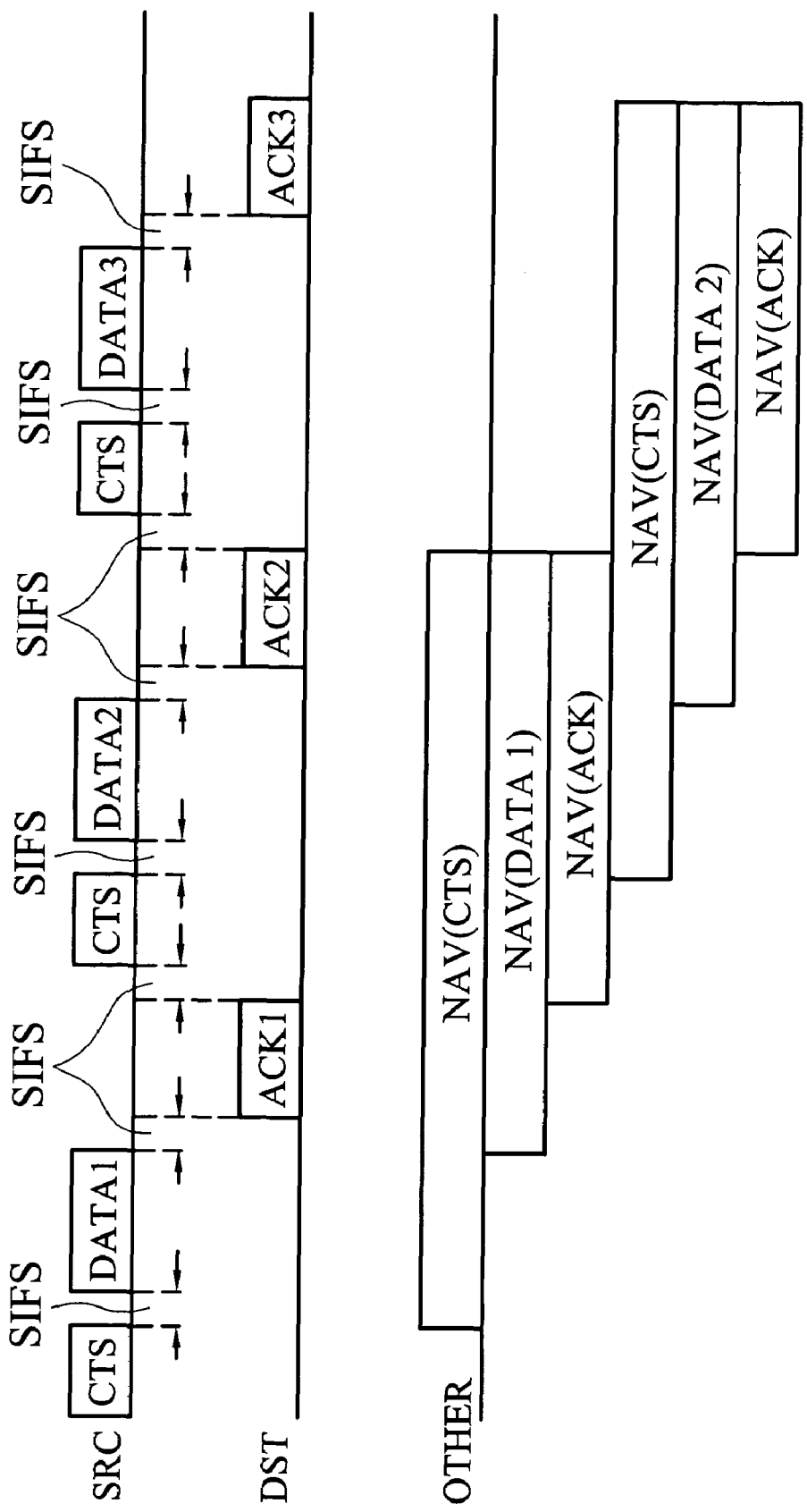
Figure 3A:
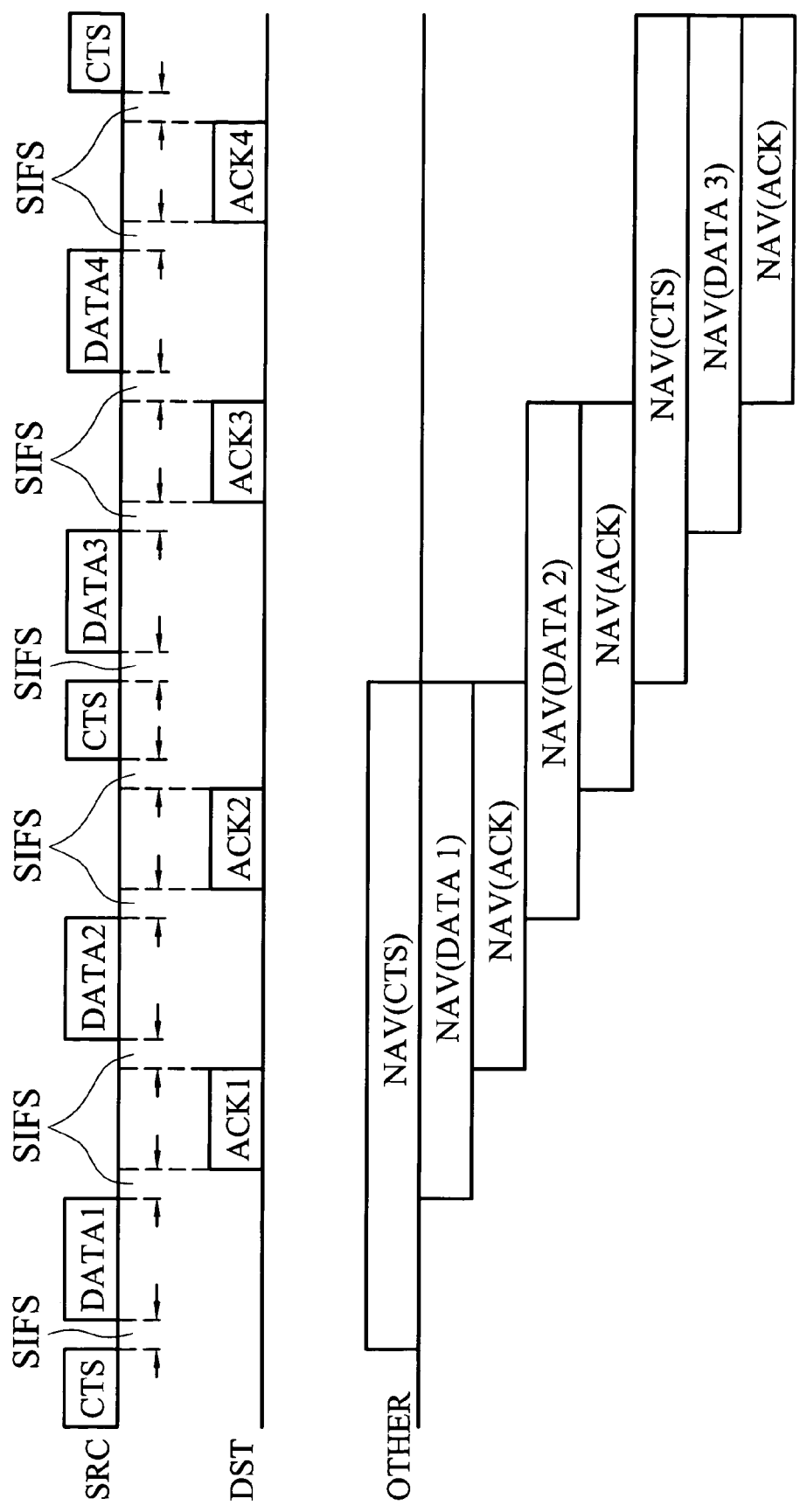
FIGS. 3a and 3b show an embodiment of the hyper throughput transmission timing chart according to the invention.

FIG. 3a shows an embodiment of the hyper throughput transmission timing chart according to the invention. In the mixed local area network shown in FIG. 2a, when a source SRC is to deliver data to a destination DST in burst mode, an advanced CTS-to-self mechanism is performed to reduce overhead of the non-DATA frames. First, the SRC initiates the transmission by sending a CTS frame. The CTS comprises an NAV to reserve the medium for a predetermined time. Specifically, the medium is reserved until the next CTS is delivered. In the period between the first and second CTS frames, data transmissions are performed. The data transmission consists of several DATA/ACK pairs. For example, FIG. 3a shows two DATA/ACK pairs in the period between the first and second CTS. The source SRC sends a DATA1 frame, and waits for an ACK1 frame from the destination DST within one SIFS interval. If the ACK1 is not received in time, the transmission of DATA1 is deemed a failure, and retransmission is performed. If the ACK1 is correctly received, A DATA2 frame is then delivered and another ACK2 frame is expected. The period reserved by the CTS's NAV maybe adjustable to allow more DATA/ACK delivery. The SIFS interval is essentially between every adjacent frame throughout the transmission, and is part of the conventional standard, thus detailed explanation thereof is omitted herein. In comparison to the conventional CTS-to-self mechanism in FIG. 2b, the disclosed CTS provides an NAV capable of protecting more DATA/ACK pairs, thus two or more DATA frames can be transferred more efficiently within one NAV period. In FIG. 3a, the destination DST needs no modification, providing full compatibility with present standards.

Figure 3B:
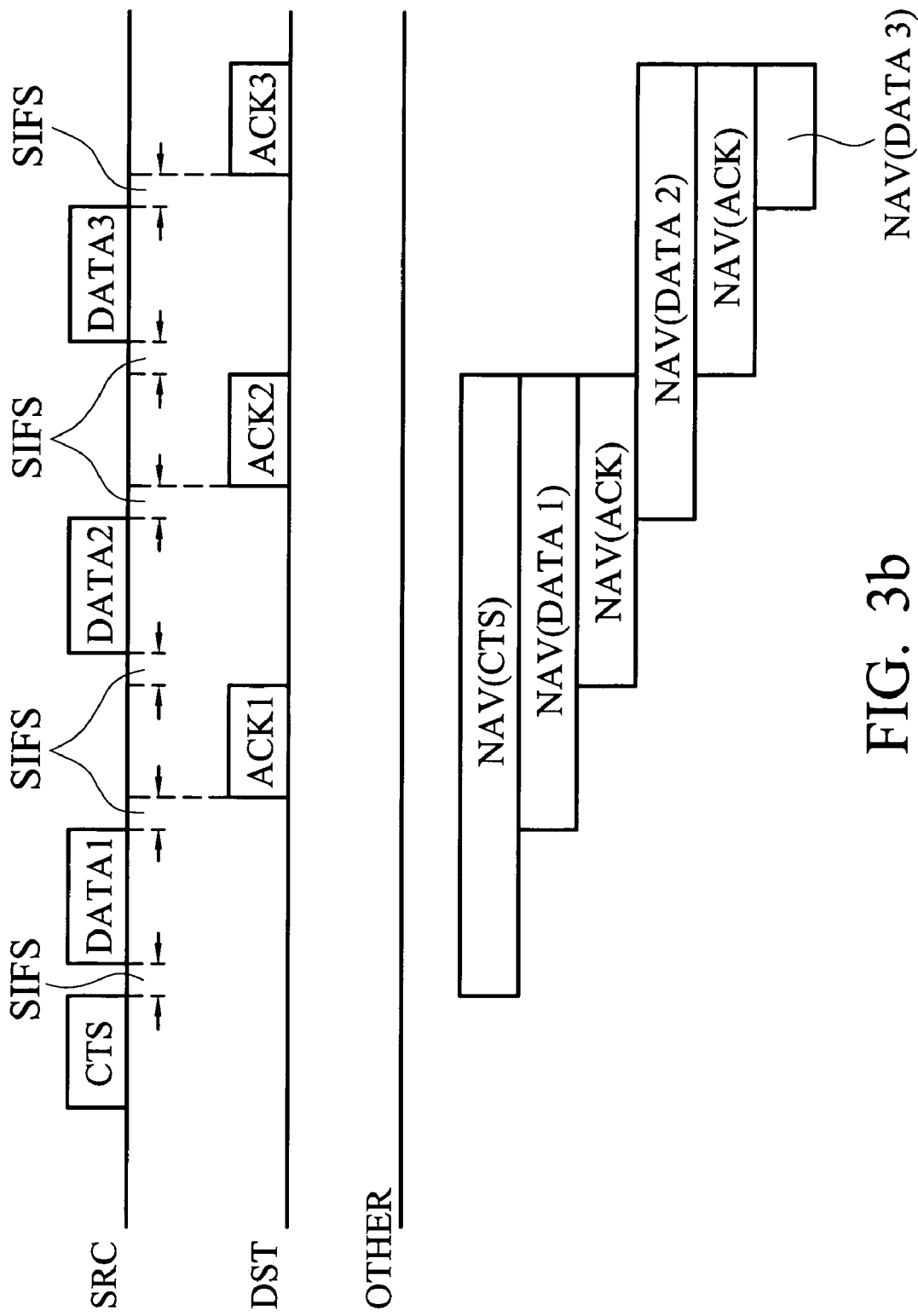

FIG. 3b shows an improved embodiment of FIG. 3a. The source and destination are compromised to handshake in a special mode. A plurality of DATA/ACK pairs are consecutively transferred after the initial CTS frame until all DATA frames are delivered. In this embodiment, the ACK frames is CCK modulated, whereas conventional ACK frames are OFDM modulated. The ACK frames therefore provide NAV to protect successive DATA/ACK transmissions. For example, the NAV of ACK1 protects DATA2 and ACK2, the NAV of ACK2 protects DATA3 and ACK3, and so on. In this way, redundant CTS frames are not necessary, and the overhead for burst transmission is reduced. In FIG. 3b, the destination DST is modified to operate in the special mode.

In the embodiment of FIGS. 3a and 3b, the CTS frames are CCK modulated, and the data and ACK frames are OFDM modulated. The source is an AP supporting 802.11b and 802.11g and the destination is a STA supporting 802.11g, therefore the transmission is a downlink. Alternatively, when the BSS is small, the roles of source/destination may be exchanged to implement an uplink.

Figure 4A:
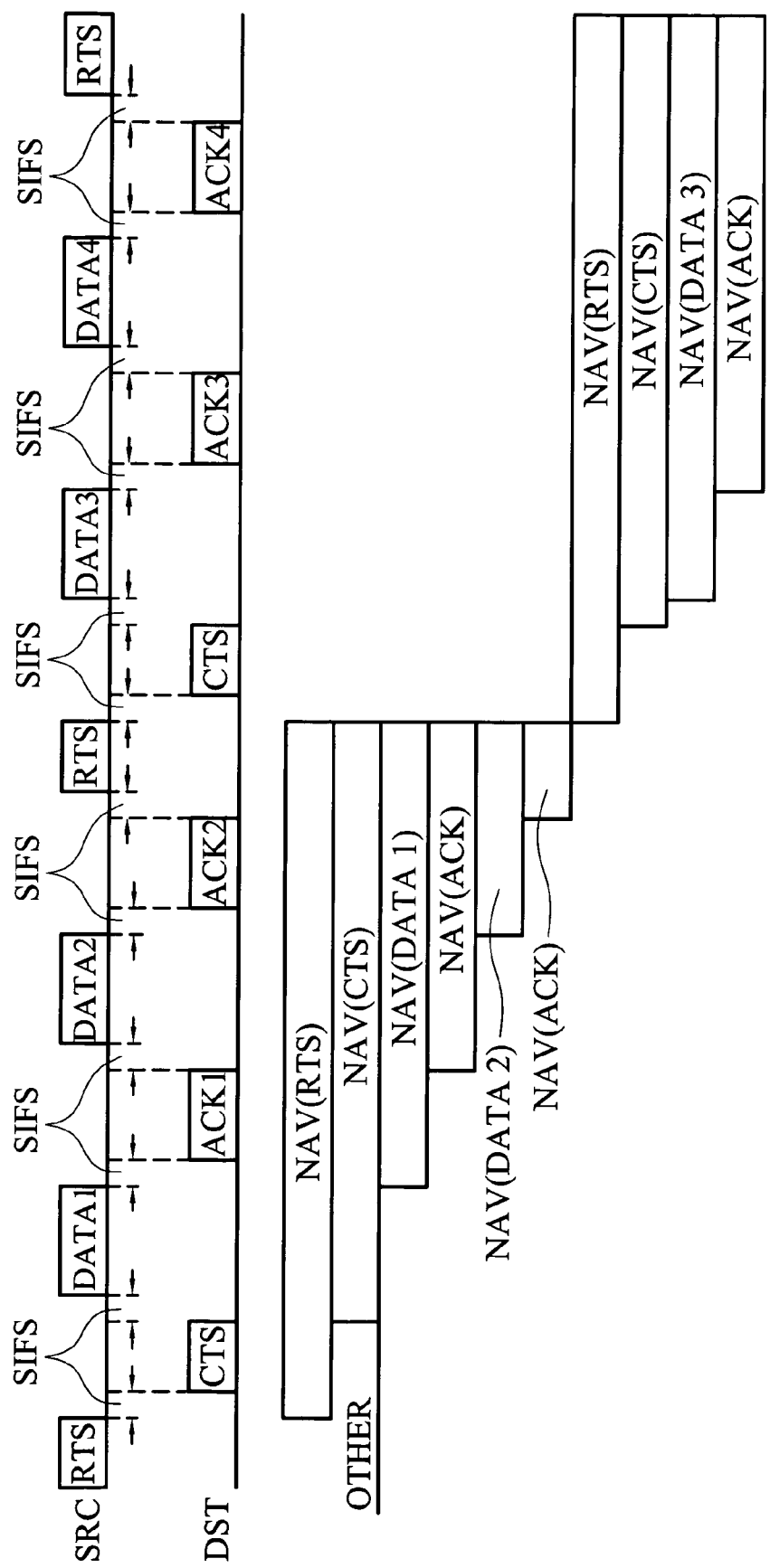
FIGS. 4a and 4b show another embodiment of the hyper throughput transmission timing chart according to the invention.

FIG. 4a shows another embodiment of the hyper throughput transmission timing chart. When transmission is initialized by a RTS/CTS handshake, two pairs of DATA/ACK frames are transferred, and another RTS/CTS handshake takes places thereafter. The RTS frame comprises an NAV protecting the medium until next RTS, thereby the transmission is both in burst mode and protection mode. The RTS, CTS and ACK frames are CCK modulated, whereas the DATA frames are OFDM modulated.

Figure 4B:
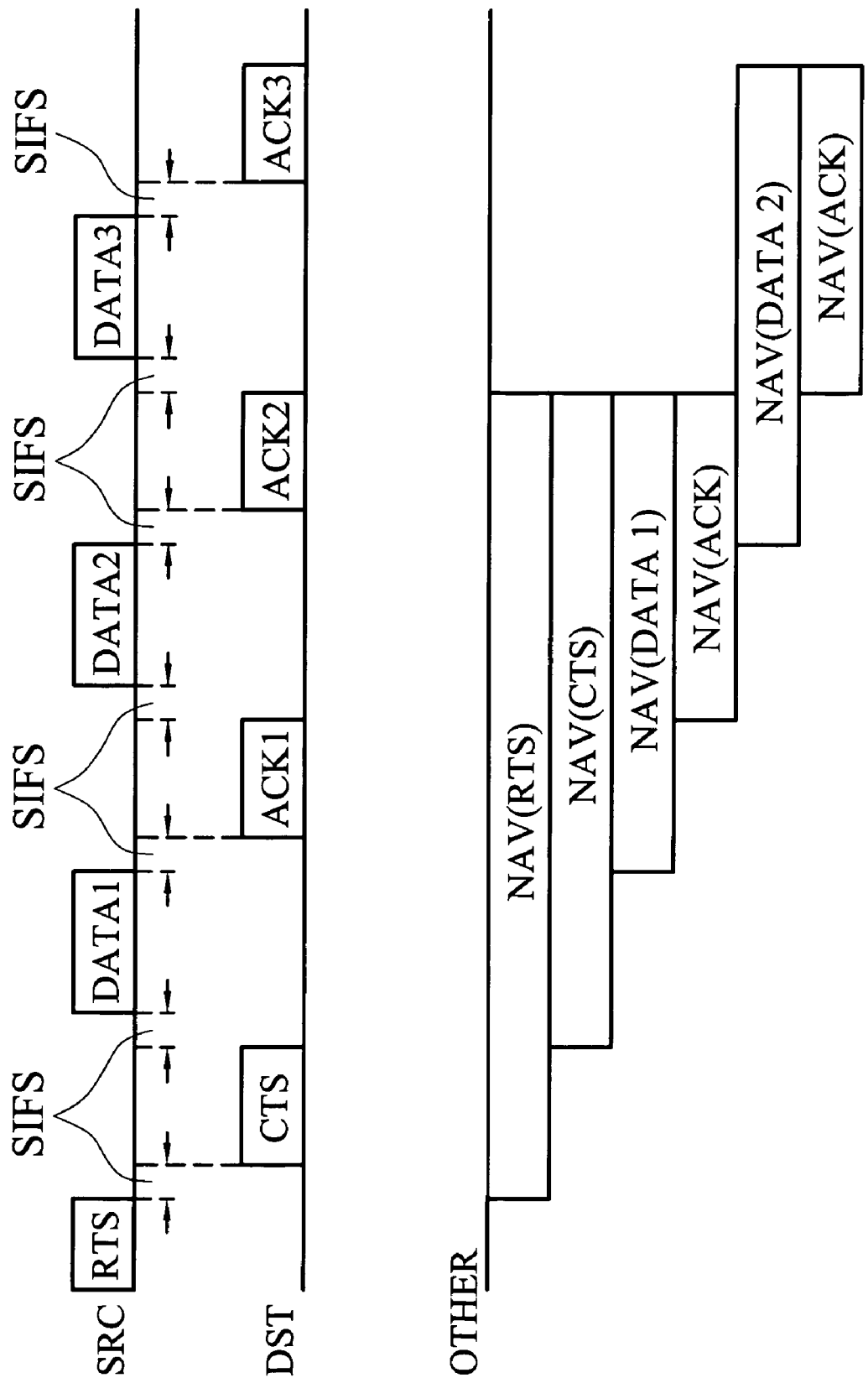

FIG. 4b shows an advanced embodiment of FIG. 4a. If the source and destinations compromise a specific mode, the transmission overheads can be further reduced. In this case, the source SRC initiates the transmission by sending an RTS frame. The destination DST returns a CTS frame upon receiving the RTS, such that the RTS/CTS handshake is established. The RTS contains an NAV reserving the medium for a period of time. Thereafter, a plurality of DATA/ACK pairs are transferred within the NAV period. Specifically, the NAV of RTS reserves a period from the falling edge of the RTS to the falling edge of the second ACK2, allowing two DATA frames, two ACK frames and all the SIFS intervals therebetween to be transmitted. For example, the NAV of RTS protects CTS, DATA1, ACK1, DATA2, and ACK2. The CTS also contains an NAV protecting DATA1, ACK1, DATA2, and ACK2.

In the embodiments of FIGS. 4a and 4b, the ACK frames are CCK modulated, unlike conventional ACK frames utilizing the OFDM modulation. This mechanism, referred to as high throughput protect mode (HTPM), is specifically applied for uplink, thus the source SRC is a STA and the destination DST is an AP. The STA and AP compromise before entering the HTPM. First, the STA and AP authenticate each other by asserting a flag in the association stage, to indicate the support of HTPM. The STA then sends an RTS containing an NAV reserving a duration exceeding one frame, thereby the AP enables HTPM to receive data.

Figure 5A:
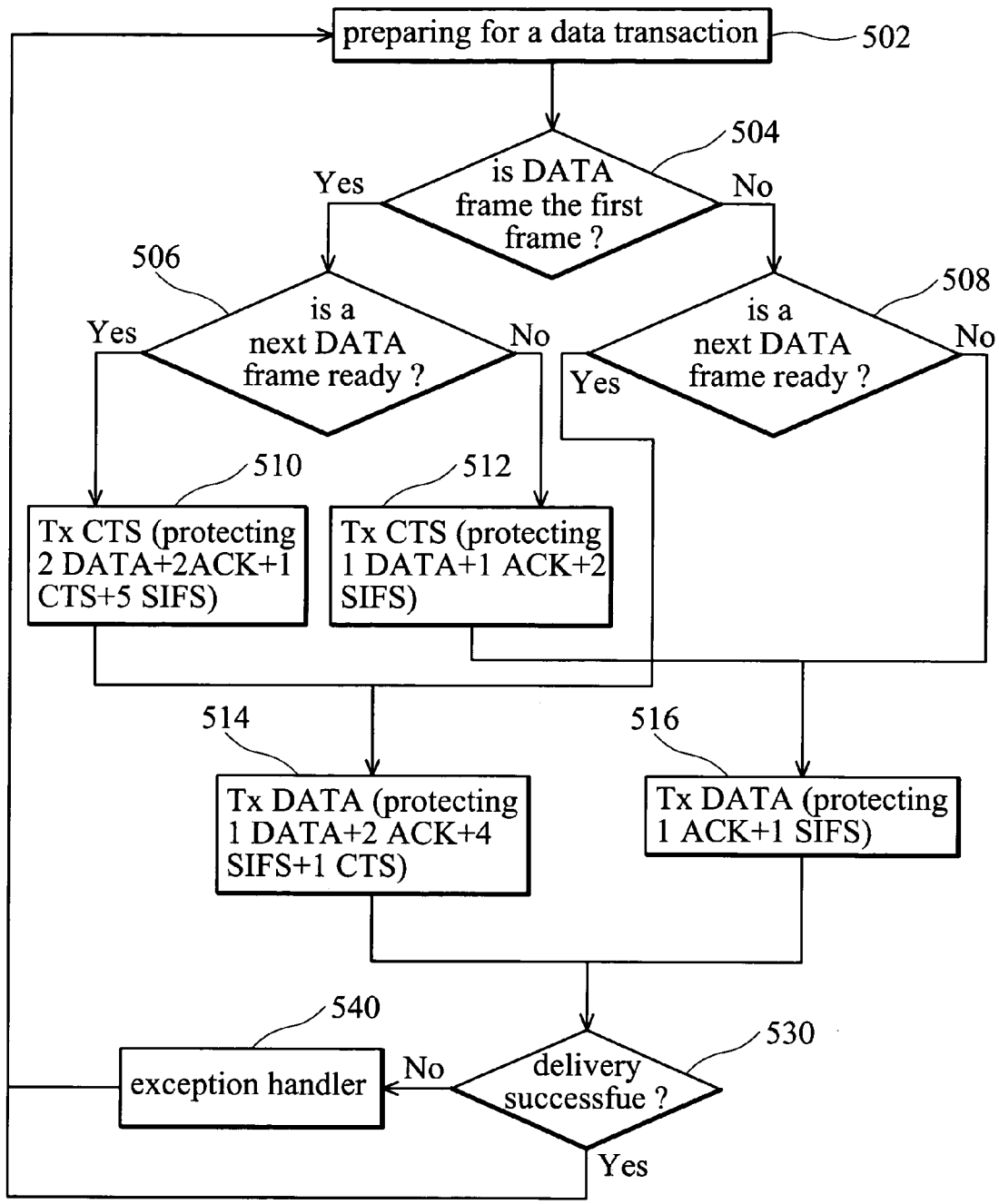
FIGS. 5a and 5b are flowcharts of the hyper throughput mechanism according to FIGS. 3a and 3b.

FIG. 5a is a flowchart of the hyper throughput mechanism in FIG. 3a. In step 502, a data frame is provided. In step 504, the source SRC determines whether the DATA frame is the first frame following the CTS frame. In both cases, step 506 and 508, the source SRC also determines whether a successive DATA frame is queued for delivery. Yes in step 506 proceeds to step 510, in which the source SRC sends a CTS protecting two data frames, two ACK frames, one CTS frame and five SIFS intervals. No in step 506 proceeds to step 512, in which the source SRC sends a CTS protecting one data frame, one ACK frame, and two SIFS intervals. Yes in step 508, and step 510 both proceed to step 514. Conversely no in step 508 and step 512 both proceed to step 516. Instep 514, the source SRC delivers a DATA frame containing an NAV protecting one DATA frame, two ACK frames, four SIFS intervals and one CTS frame. In step 516, the source SRC delivers a DATA frame containing an NAV protecting one ACK frame and one SIFS frame. After steps 514 and 516, in step 530, the source SRC expects ACK from the destination DST to ensure the delivery is successful. In the event of an error, step 540 performs retransmission or remains idle. Otherwise step 502 is repeated, and another round is initiated.

Figure 5B:
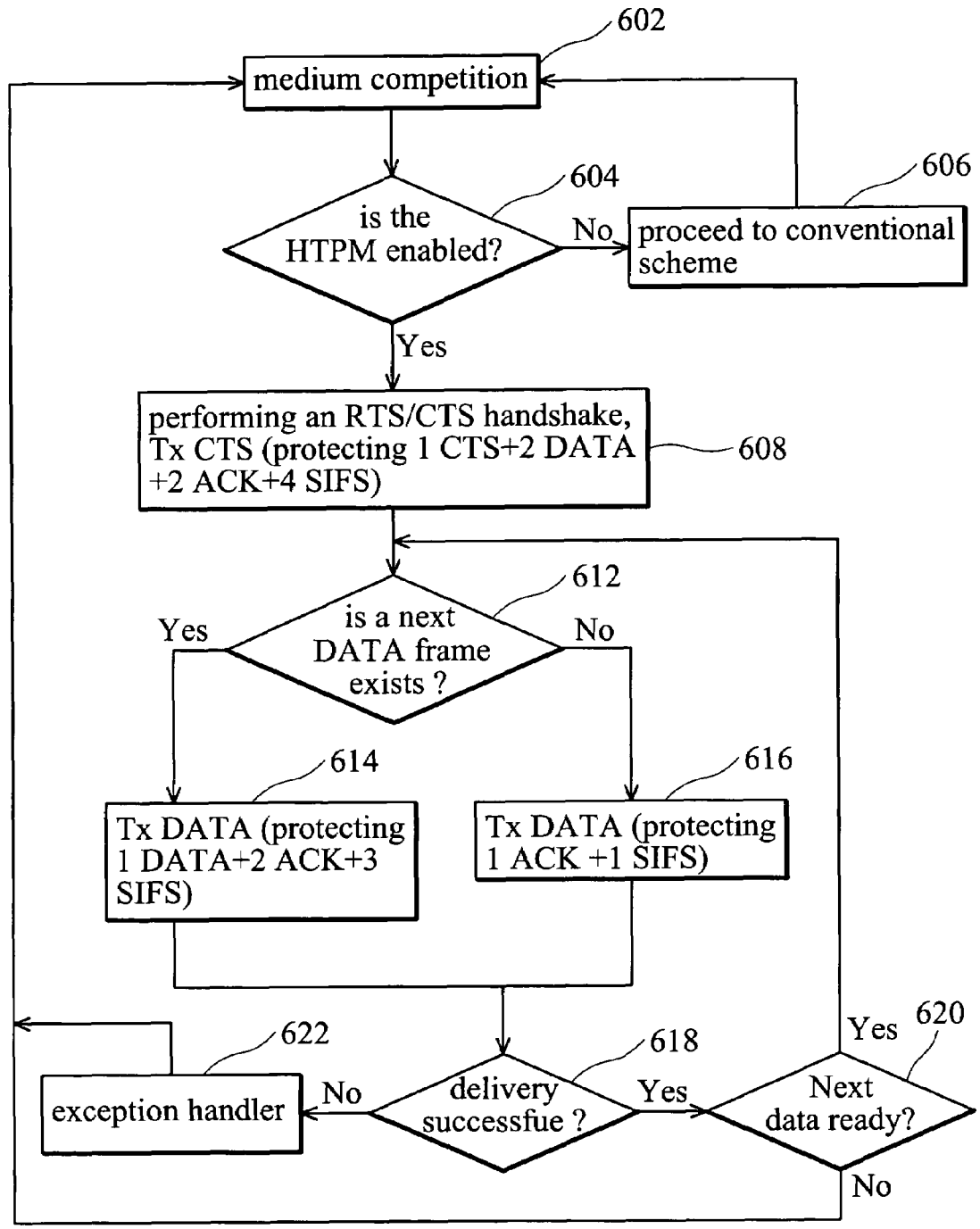

FIG. 5b is a flowchart of FIG. 3b. The redundant CTS is eliminated in the special mode. The transmission is initialized in step 602 with medium competition. In step 604, the source and destination check support of the HTPM mode. IF not, proceed normal transmission in step 606, else step 608 is performed. In step 608, the source SRC and destination DST perform an RTS/CTS handshake, in which the CTS frame contains an NAV protecting one CTS frame, two DATA frames, two ACK frames and four SIFS intervals. Thereafter in step 612, the source SRC determines whether the following DATA frame exists before sending the present DATA frame. Yes in step 612 proceeds to step 614, otherwise proceeds to step 616. In step 614, the DATA frame is delivered with an NAV protecting one DATA frame, two ACK and three SIFS intervals. In step 616, the DATA frame is delivered with an NAV protecting one ACK frame and one SIFS interval. Thereafter, in step 618, the source SRC expects an ACK frame from the destination DST to ensure the delivery is successful. In the event of an error, step 622 provides an exception handler. Otherwise proceed to step 620, determining whether a next data frame is ready for transmission. Yes in step 620 proceeds to step 612 for another DATA delivery, and no in step 620 returns to step 602.

Figure 6A:
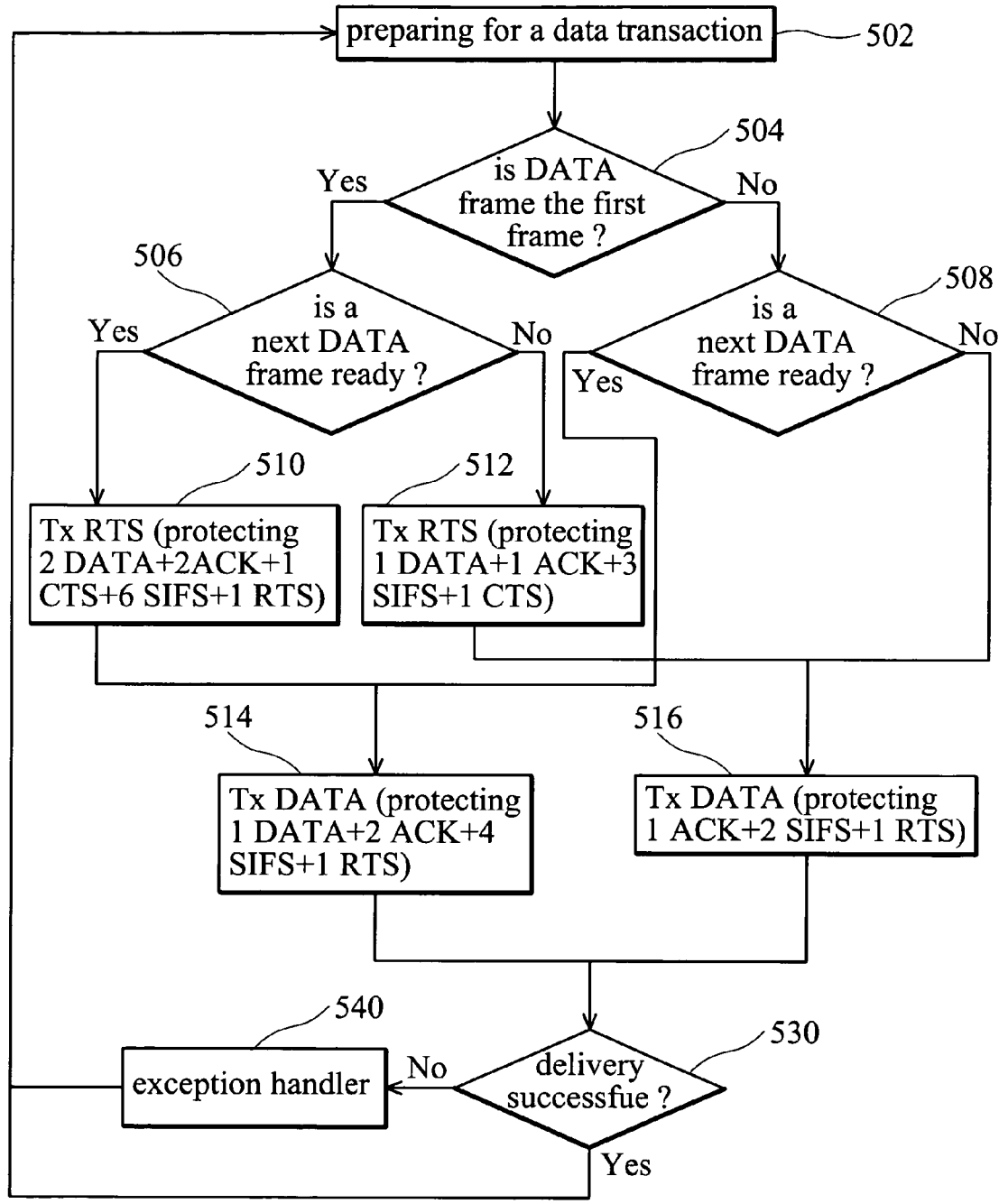
FIGS. 6a and 6b are flowcharts of the hyper throughput mechanism according to FIGS. 4a and 4b.

FIG. 6a is a flowchart according to FIG. 4a. In step 502, a data frame is provided. In step 504, the source SRC determines whether the DATA frame is the first frame following the CTS frame. In both cases, step 506 and 508, the source SRC also determines whether a successive DATA frame is queued for delivery. Yes in step 506 proceeds to step 510, in which the source SRC sends an RTS frame protecting two data frames, two ACK frames, one CTS frame, one RTS frame and five SIFS intervals. No in step 506 proceeds to step 512, in which the source SRC sends an RTS frame protecting one data frame, one ACK frame, one CTS frame and three SIFS intervals. Yes in step 508, and step 510 both proceed to step 514. Conversely no in step 508 and step 512 both proceed to step 516. In step 514, the source SRC delivers a DATA frame containing an NAV protecting one DATA frame, two ACK frames, four SIFS intervals and one RTS frame. In step 516, the source SRC delivers a DATA frame containing an NAV protecting one ACK frame one RTS frame and two SIFS frame. After steps 514 and 516, in step 530, the source SRC expects ACK from the destination DST to ensure the delivery is successful. In the event of an error, in step 540, an exception handler performs retransmission or remains idle. Otherwise step 502 is repeated, and another round is initiated.

Figure 6B:
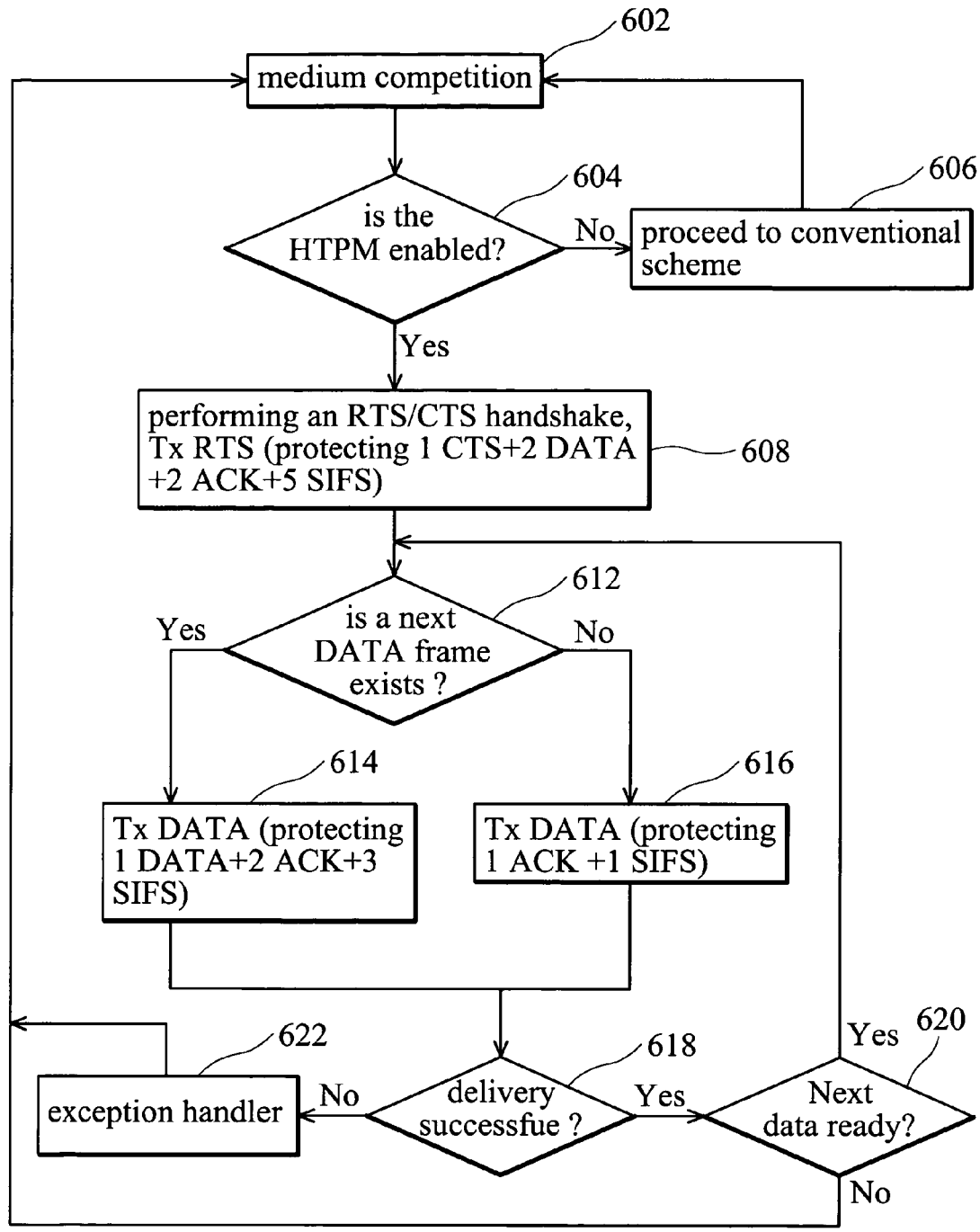

FIG. 6b is a flowchart of the hyper throughput mechanism in FIG. 4b. Steps 602, 604 and 606 are identical to FIG. 5b. Instep 608, the source SRC and destination DST perform an RTS/CTS handshake, in which the CTS frame contains an NAV protecting one CTS frame, two DATA frames, two ACK frames and five SIFS intervals. Thereafter in step 612, the source SRC determines whether the following DATA frame exists before sending the present DATA frame. Yes in step 612 proceeds to step 614, otherwise proceeds to step 616. In step 614, the DATA frame is delivered with an NAV protecting one DATA frame, two ACK and three SIFS intervals. In step 616, the DATA frame is delivered with an NAV protecting one ACK frame and one SIFS interval. Thereafter, in step 618, the source SRC expects an ACK frame from the destination DST to ensure the delivery is successful. In the event of an error, step 622 provides an exception handler. Otherwise proceed to step 620, determining whether a next data frame is ready for transmission. Yes in step 620 proceeds to step 612 for another DATA delivery, and no in step 620 returns to step 602.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A packet transmission method for a wireless local area network wherein a source transmits data to a destination, comprising:

performing a first initialization transaction to initialize a first burst transmission, wherein the first initialization transaction consists of the source delivering a first clear-to-send (CTS) frame;

initializing the first burst transmission at one SIFS interval after completion of the initialization transaction, wherein said first burst transmission does not deliver any CTS frame;

delivering a plurality of data frames from the source to the destination;

awaiting an ACK frame from the destination within one SIFS interval when each data frame is delivered; and delivering the successive data frame at one SIFS interval after upon receipt of the ACK frame when a successive data frame is ready, and repeating the awaiting step, wherein upon completion of the first burst transmission, the source holding one SIFS interval and performs a second initialization transaction to initialize a second burst transmission, said the second initialization transaction consists of the source delivering a second clear-to-send (CTS) frame; and the first CTS frame comprises a network allocation vector (NAV) reserving the medium for a duration beginning at the falling edge of the first CTS frame and ending at the falling edge of the second CTS frame.

2. The packet transmission method as claimed in claim 1, wherein if the ACK frame is not received within one SIFS interval, the data frame is deemed lost and retransmission is performed.

3. The packet transmission method as claimed in claim 1, wherein the burst transmission delivers two data frames in response to the first initialization transaction.

4. The packet transmission method as claimed in claim 1, wherein the first and second CTS frames are CCK modulated, and the data frames are OFDM modulated.

5. The packet transmission method as claimed in claim 1, wherein:

the source is an AP supporting both 802.11b and 802.11g; and the destination is a STA supporting only 802.11g.

6. The packet transmission method as claimed in claim 1, wherein the source is a STA supporting only 802.11g; and the destination is an AP supporting both 802.11b and 802.11g.

7. A wireless local area network system, comprising:

means for sending a plurality of data frames;

means for receiving the plurality of data frames;

wherein the means for sending initializes a first burst transmission by performing a first initialization transaction consisting of the means for sending delivering a first clear-to-send (CTS) frame;

means for initializing the first burst transmission at one SIFS interval after completion of the first initialization transaction, wherein during the first burst transmission, the means for sending does not deliver any CTS frame to the means for receiving;

means for delivering the plurality of data frames to the means for receiving;

means for sending awaits an ACK frame from the means for receiving within one SIFS interval when each data frame is delivered; and means for sending delivers the successive data frame at one SIFS interval after upon receipt of the ACK frame when a successive data frame is ready, and repeating the means for sending awaits the ACK frame, wherein upon completion of the first burst transmission, the means for sending holds one SIFS interval and performs a second initialization transaction to initialize a second burst transmission, said the second initialization transaction consists of the means for sending delivering a second clear-to-send (CTS) frame; and the first CTS frame comprises a network allocation vector (NAV) reserving the medium for a duration beginning at the falling edge of the first CTS frame and ending at the falling edge of the second CTS frame.

8. The wireless local area network system as claimed in claim 7, further comprising a means for handling retransmission operative when the ACK frame is not received within one SIFS interval.

9. The wireless local area network system as claimed in claim 7, wherein the burst transmission delivers two data frames in response to the first initialization transaction.

10. The wireless local area network system as claimed in claim 7, wherein the first and second CTS frames are CCK modulated; and the data frames are OFDM modulated.

* * * * *

UNITED STATES PATENT AND TRADEMARK OFFICE
CERTIFICATE OF CORRECTION

PATENT NO. : 7,623,481 B2  Page 1 of 1
APPLICATION NO. : 11/243047
DATED : November 24, 2009
INVENTOR(S) : Sheng-Chung Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 961 days.

Signed and Sealed this

Fourteenth Day of December, 2010

David J. Kappos
*Director of the United States Patent and Trademark Office*